Aug. 20, 1963    F. T. BARR ET AL    3,101,307
UTILIZATION OF PROTON RECOIL ENERGY IN NEUTRON
IRRADIATED VAPOR PHASE ORGANIC REACTIONS
Filed Nov. 14, 1958
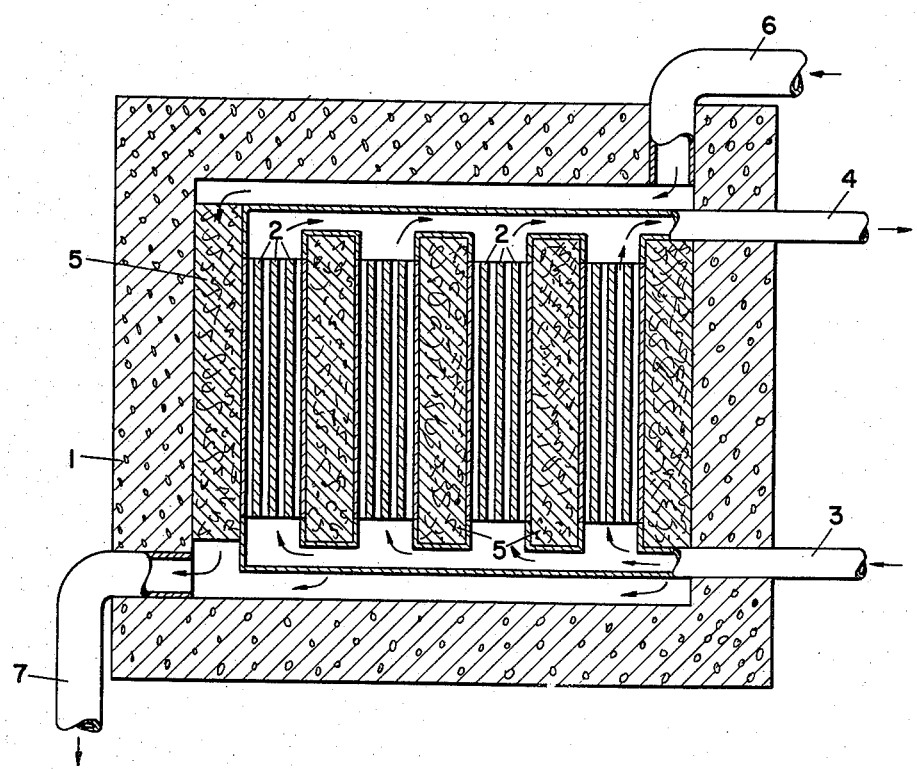
Frank T. Barr
Thomas A. Reiter    INVENTORS
BY Frank T. Johmann
ATTORNEY

UTILIZATION OF PROTON RECOIL ENERGY IN NEUTRON IRRADIATED VAPOR PHASE ORGANIC REACTIONS

Frank T. Barr, Summit, and Thomas A. Reiter, Chatham, N.J., assignors to Esso Research and Engineering Company, a corporation of Delaware
Filed Nov. 14, 1958, Ser. No. 773,956
8 Claims. (Cl. 204—154.2)

The present invention is concered with a process for the radio-conversion of vaporous organic materials by, in part, absorption of energy from recoil protons. More specifically, the present invention proposes a process for the conversion of such organic materials as olefin/paraffin mixtures by neutron irradiation carried out in such a manner that an appreciable portion of the energy for the conversion is derived from recoil protons.

It has been proposed to use a nuclear reactor for the process irradiation and conversion of organic materials. One of the problems encountered in the design of a nuclear reactor for the radiation of hydrocarbon vapors is the low energy absorption per volume of irradiation zone. The most efficient utilization of the fission energy of a nuclear reaction by the organic reactants occurs when the nuclear reactor consists entirely of the organic or hydrocarbon vapor and the fissile fuel, i.e., one in which no foreign materials are present to absorb energy. In such a theoretical system, the organic material supplies the necessary moderation for the neutrons released by the fission process to continue the reaction. For such a mixture of vapor and fissile material to form the core of a thermal reactor, the resulting critical core size is excessively large.

The present invention is directed to this problem of designing a nuclear reactor, or more particularly, a reaction zone in a nuclear reactor, for the conversion of organic material by neutron irradiation while maintaining the size of the nuclear reactor within realistic limits. In the preferred design of this invention, the organic reaction or conversion zone serves to impart appreciable moderation to the nuclear reaction process.

The present invention proposes a process or system wherein the hydrogen nuclei content of the organic reaction zone is appreciably increased to improve the energy absorption in the organic reaction zone. According to this invention, hydrogen-bearing fibers are added to the reaction zone to increase proton recoils due to fast neutron-scattering collisions and to increase local dosages in the hydrocarbon or organic vapor undergoing conversion. This permits reduction of the core of the nuclear reactor to a more realistic and less costly size while still recovering some of the fast neutron kinetic energy as radiation for promoting chemical reactions.

In brief compass, this invention proposes a process for converting vaporous organic materials by absorption of energy from recoil protons. This improved process comprises maintaining in a reaction zone spaced fixed hydrogen-bearing, e.g. organic polymers, inorganic hydrides such as Li-7 hydride, which may be bound by metal, etc., fibers having a diameter in the range of about 0.5 to 20 microns and a high concentration of hydrogen nuclei. The reaction zone containing the fibers is exposed to irradiation by fast neutrons, and the vaporous organic material to be converted is passed through the reaction zone. The fast neutrons collide with the hydrogen nuclei of the fibers and create recoil protons. Because of the small diameter of the fibers, a major proportion of the recoil protons created pass into the organic vapors undergoing conversion wherein their energy is absorbed. The organic vapors so irradiated then are withdrawn from the reaction zone, and the desired product is recovered therefrom. By the design of this invention, the energy absorption in a vapor phase organic conversion zone is increased by at least 20% over a reactor with a separated moderator zone. This results in appreciable design economies.

In the preferred embodiment of this invention, the organic reactant material and the hydrogen-bearing fibers in the reaction zone serve as the principal moderator for the nuclear reactor. The organic conversion zone is placed in such a manner with respect to the fissile material that the hydrogen nuclei in the organic conversion zone serve to moderate the fast neutrons generated by the fission process to the necessary thermal or intermediate velocity neutrons to permit continuation of the fission chain reaction.

Besides increasing the energy absorption in the organic conversion zone, the use of fibers according to this invention makes it possible to hold the desired high concentration of hydrogen nuclei in the organic reaction zone in a convenient form. Thus, it is not necessary to add to the organic vapors loose liquid or solid materials that must be later removed from the vapors during recovery of the product. The fibers being in relatively fixed relationship to the vapors remain in the reaction zone while the irradiated organic vapors can be recovered from the reaction zone substantially free from the hydrogen-bearing fibers.

Another advantage accruing to this invention is that the necessary high concentration of hydrogen nuclei can be obtained in the organic conversion zone without the necessity of the use of high pressures. In many instances, the organic material, e.g., a hydrocarbon, undergoing conversion has the requisite ratio of hydrogen nuclei to other nuclei to serve as an effective moderator, but, because the material is in vaporous form, the density or concentration of the hydrogen nuclei is not sufficient to serve as an effective moderator unless a reactor of unrealistic size is used.

Some radiation reactions exhibit a square root of intensity effect, i.e. the rate of reaction is proportional to the square root of the radiation intensity and the utilization efficiency is inversely proportional. Therefore, this invention has the added advantage of providing the flexibility in reactor design to permit optimum use of the radiation and reactor volume. The concentration of fibers may be varied within the reactor space to give improved uniformity of radiation intensity. For example, by using 70 vol. percent fibers and 30 vol. percent of 0.1 g./cc. reacting vapor, the effective dose rate may be increased to 150% of the dose rate with vapor alone.

The process of this invention can be applied to any of the known vaporous radio-conversion reactors. Thus, the process can be used for radio-isomerizations of paraffin hydrocarbons, radio-alkylation of paraffin hydrocarbons with olefins, radio-polymerizations, such as the radio-polymerization of cetane to form high viscosity index lubricating oils, radio-hydrogenations and radio-cracking reactions, such as the radio-conversion of gas oils to gasolines by irradiation and the use of relatively high temperatures in the order of 600 to 700° F.

Preferred feed stocks are $C_{16}$ paraffins which can be polymerized according to this invention.

The drawing attached to and forming a part of this specification illustrates a preferred embodiment of this invention wherein the organic conversion zone is located in and about the fuel elements of the heterogeneous nuclear reactor, supplying moderation thereto while receiving radiant energy.

In the design shown, a liquid coolant is used to extract heat from the fuel elements. The heat thus extracted can be used for the generation of power in a conventional manner or for process heat.

A heterogeneous reactor wherein the fuel elements are fixed in the reactor is a preferred design. The fixed fuel elements can be of any suitable design such as rod, bars, plates, contained pebbles or particles, and the like. Alternatively, however, the design of this invention is applicable to homogeneous reactors where the fissile material-containing fuel is suspended or dissolved in the coolant and flows with it. Examples are liquid bismuth and water cooled systems containing dissolved uranium, and systems based on the use of molten fluorides.

By "fissile material" is meant those isotopes capable of sustaining a nuclear chain reaction by capture o fa neutron and release of further neutrons. Examples are uranium 235 and 233, and plutonium 239. The fuel incorporating these fissile materials can comprise the elements of the same atomic number as those isotopes containing the natural proportion of the fissile material, or the elements can be enriched with the fissile material to any desired extent. The fuel can exist as a pure element, or mixture of the fissile material-containing elements, or can be in the form of compounds, oxides, carbides, alloys as with aluminum, zirconium, or clad with aluminum, zirconium, stainless steel, or their alloys, as known in the art. While solid fuels are preferred, the fuel can be in liquid or gaseous form, so long as it is suitably contained.

The fuel can also be combined with moderating materials such as carbon, beryllium, or water, ordinary or heavy. This moderating material can be physically or chemically associated with the fuel, or can exist separately within the fuel element, as is desired.

Referring to the drawing, illustrated is a heterogeneous nuclear reactor encased in a biological shield 1. The reactor comprises a series of fuel elements 2 arranged in a pattern giving an efficient nuclear reaction. The fuel elements comprise, for example, the longitudinal plate-type elements known to the art. Fuel elements are cooled by coolants such as liquid sodium supplied by header 3 and removed through header 4. The coolant flows up and around each of the fuel elements and is removed overhead. This coolant, having its enthalpy increased by contact with fuel elements, is transferred by line 4 to a heat exchange means or other system, and is cooled before being returned to line 3. The heat exchange system (not shown) can be used for the heating of a second heat transfer medium such as steam. The steam can then be used for the generation of power such as in a turbo-electric generator. Surrounding the fuel elements is the organic conversion zone 5. Zone 5 is filled with loosely packed wool or cotton-like organic fibers according to this invention, in order to increase the amount of energy absorbed in zone 5. Preferably, the organic or other hydrogen-bearing fibers have a diameter in the range of 0.5 to 20 microns whereby the protons liberated by the neutron collisions with the hydrogen atoms in the fibers are permitted to escape into the vapor surrounding the fibers. The fibers occupy 1 to 80% of the free volume of zone 5. The fibers have a true density in the range of 0.5 to 2 grams per cubic centimeter and preferably have a hydrogen nuclei ratio to other nuclei greater than 0.9. The fibers are arranged or packed into zone 5 in such a manner that the density of the fibers on the average in zone 5 is in the range of 0.005 to 1.6 grams per cubic centimeter.

The organic material to be converted is supplied to zone 5 by line 6. The material flows in and about the fibers undergoing irradiation and is removed by line 7. The temperature and pressure in zone 5 may vary widely according to the reaction being carried out. Generally, for the preferred type of reactions wherein cetane is converted, the temperature will be in the range of 100° to 900° F. and the pressure will be in the range of 1 to 1000 p.s.i. If desired, the fuel element zones can be thermally insulated from the organic reaction zone in order to permit maintenance of a substantially different temperature in the latter. According to this invention, it is possible to maintain a concentration of hydrogen nuclei on the average in reaction zone 5 in the range of $10^{20}$ to $10^{23}$ nuclei per centimeter$^3$. Thuse, reaction zone 5 supplies moderation to the fuel elements 2. The neutrons released by the fission process are slowed down to the requisite energy to sustain the fission reaction by collision with hydrogen and carbon nuclei in the molecules of the organic material.

Generally, the concentration of fissile material in the nuclear reactor is in the range of 7 to 60 grams per liter of total reactor volume. The density of organic reaction material present is on the average of 5 to 10 pounds per cubic foot. The nuclear reactor can operate at any desired power level so that at end of core life the fissile material burnup, expressed as uranium 235, is up to 3 or 4 atom percent. When the reactor is operated for power generation, as illustrated in the attached drawing, the coolant flow rate will normally be in the range of 5 to 500 pounds per hour per gram of fissile material. The flow rate of the vaporous organic material in zone 5 will usually be in the range of 25 to 5000 pounds per gram of fissile material in the core per day. Preferably, the average flux of fast neutrons, i.e., neutrons having an energy above 100 e.v., is in the range of $10^{11}$ to $5 \times 10^{14}$ neutrons per square centimeter per second (cm.$^2$/sec.). The gamma ray radiation associated with the neutron flux is usually in the range of $10^6$ to $2 \times 10^8$ roentgens per hour. In most power generation processes, the coolant will have an exit temperature in the range of 400 to 1000° F. or more and an inlet temperature in the range of 250 to 950° F. undergoing a delta T in the range of 10 to 750° F.

Suitable reactor control means, valves, boron/steel shutdown rods, etc. (not shown) are of course used in conjunction with the nuclear reactor, as is known in the art.

The coolant can be of any suitable type, such as liquid sodium, water, biphenyl, terphenyl, fused salts, etc. It is preferred to use materials that are substantially nonmoderating of fast neutrons. In this manner, more of the neutron energy is absorbed in the organic processing-moderation zone. The hydrogen-bearing fibers used in the organic processing zone can be an organic of any suitable type, such as polyethylene in the 10,000 to 200,000 molecular weight range, nylon, polyisobutylene, polystyrene possibly with additives (cross-linking agents) to assist in maintaining the structural integrity during irradiation. Also hydrides, which may be bound with metals, may be used. While fibers having a substantially circular cross section of the dimensions given are preferred, the solid fixed hydrogen-bearing material can be in the form of strips like tinfoil, however, at least one dimension of the hydrogen-bearing material preferably does not exceed 0.5 to 20 microns, to permit ready escape of the proton recoil particles.

*Example*

This example illustrates the radio-polymerization of cetane to produce high viscosity-index lube oils.

With reference to the drawing, the reactor comprises 81 fuel elements six feet long, located on 8 inch centers in a square pattern. The fuel elements comprise stainless steel conduits, 2¼ inches across, with 0.050 inch thick plates of U-235 oxide encased in stainless steel, 0.08 inch apart, filling them. . The total amount of U-235 in the fuel elements is 72.6 kilograms. Free area in each fuel element for the passage of liquid coolant is 0.02 square feet. The reactor power level is 130,000 kw. heat, and the fuel burnup rate is 0.125 gram per day. The average fuel element temperature is 950° F.

The coolant is liquid sodium. The sodium has a flow rate of $15 \times 10^6$ pounds per hour. The sodium is admitted at a temperature of 825° F. at a pressure of 25 p.s.i.g. and is removed at a temperature of 925° F. at a pressure of 10 p.s.i.g. The sodium flows through the free area in each fuel element at a rate of fifty feet per second. The heated sodium from the reactor is cooled by heat exchange with water to generate steam, and the steam is used in a turboelectric generator to obtain 40,000 kw. of electric energy. The cooled sodium from the heat exchange step is then returned via a pump to the inlet of the reactor. A thin layer of insulation (magnesia or powdered graphite) is placed between the fuel elements and processing zone 5. The temperature differential over this layer is approximately 125° F.

Fresh cetane is admitted by line 6 to processing zone 5 at a rate of 6.5 million pounds per hour, a temperature of 800° F., and a pressure of 180 p.s.i.g. Processing zone 5 is filled with Li–7 hydride fibers having a diameter of 2 microns to the extent of 8% of its free volume. The lithium hydride has a true density of about 0.82 g./cc. The average temperature of zone 5 is 800° F. The total weight of hydride and the cetane maintained in reaction zone 5 is about 1800 pounds.

The average thermal neutron flux in the core is $3.0 \times 10^{13}$ neutrons per centimeter$^2$ per second. By means of the fast neutrons, the recoil protons liberated from the fibers and associated gamma radiation, the cetane receives on the average a total radiation dose of 7 kw.h. per barrel of product per pass. The absorption of this energy causes the cetane to be polymerized to form higher addition products, principally a high V.I. lube stock and some lighter cracked products. The hydrocarbons are removed from zone 5 via line 7 at a temperature of 800° F., and a pressure of 180 p.s.i.g. The product is fractionated to separate unreacted feed material (90 wt. percent on reactor outlet) which is recycled to the inlet, and 24 wt. percent (on feed reacted) of polymerized material which can be further fractionated to yield a valuable lubricant base stock.

Having described this invention, what is sought to be protected by Letters Patent is succinctly set forth in the following claims.

What is claimed is:

1. A vapor phase hydrocarbon conversion process wherein organic materials are converted by absorption of energy from recoil protons which comprises maintaining in a reaction zone solid hydrogen bearing fibers having a diameter in the range of 0.5–20 microns, a true density in the range of 0.5 to 2 grams per centimeter$^3$, and a ratio of hydrogen nuclei to other nuclei greater than 0.9, said fibers occupying in the range of 1 to 80% of the free volume of said reaction zone, exposing said reaction zone to irradiation by fast neutrons having an average energy above 100 e.v., the average fast neutron flux in said reaction zone being in the range of $10^9$ to $10^{16}$ neutrons per centimeter$^2$ per second, passing said vaporous organic material through said reaction zone so irradiated wherein the density of said organic material during conversion is less than 0.5 gram per centimeter$^3$, removing irradiated vapors from said reaction zone and recovering product therefrom.

2. The process of claim 1 wherein the average concentration of hydrogen nuclei in said reaction zone is in the range of $10^{20}$ to $10^{23}$ nuclei per centimeter$^3$ and said reaction zone imparts moderation to an operating nuclear reactor.

3. A vapor phase process for producing a high viscosity index lube product from a hydrocarbon feed, consisting essentially of cetane, by the adsorption of energy from recoil protons which comprises maintaining in a reaction zone hydrogen bearing fibers having a diameter in the range of 0.5–20 microns, a true density in the range of 0.5 to 2 grams per centimeter$^3$, and a ratio of hydrogen nuclei to other nuclei greater than 0.9, said fibers occupying in the range of 1 to 80% of the free volume of said reaction zone, exposing said reaction zone to irradiation by fast neutrons having an average energy above 100 e.v., the average fast neutron flux in said reaction zone being in the range of $10^9$ to $10^{16}$ neutrons per centimeter$^2$ per second, passing said hydrocarbon feed in the vapor phase through said reaction zone, so irradiated, at a temperature in the range of 200–900° F. and a pressure in the range of up to 300 p.s.i.g., wherein the density of said organic material during conversion is less than 0.5 gram per centimeter$^3$, and wherein the range of 1–50 weight percent per pass of high viscosity index lube product is recovered from said irradiated vapors.

4. A process for converting vaporous organic materials by absorption of energy from recoil protons which comprises maintaining in a reaction zone hydrogen bearing fibers wherein said hydrogen bearing fibers are formed from an organic polymer having a molecular weight in the range of 10,000 to 200,000, having a diameter in the range of 0.5–20 microns, a true density in the range of 0.5 to 2 grams per centimeter$^3$, and a ratio of hydrogen nuclei to other nuclei greater than 0.9, said fibers occupying in the range of 1 to 80% of the free volume of said reaction zone, exposing said reaction zone to irradiation by fast neutrons having an average energy above 100 e.v., the average fast neutron flux in said reaction zone being in the range of $10^9$ to $10^{16}$ neutrons per centimeter$^2$ per second, passing said vaporous organic material through said reaction zone so irradiated at a pressure and a temperature sufficient to assure substantial maintenance of vapor phase conditions and maintenance of the density of said organic material during conversion of less than 0.5 gram per centimeter$^3$, removing irradiated vapors from said reaction zone and recovering product therefrom.

5. The process of claim 4 wherein said polymer is polyethylene.

6. A process for converting vaporous organic material by absorption of energy from recoil protons which comprises maintaining in a reaction zone hydrogen bearing fibers wherein said hydrogen bearing fibers consist essentially of lithium-7 hydride, having a diameter in the range of 0.5–20 microns, a true density in the range of 0.5 to 2 grams per centimeter$^3$, and a ratio of hydrogen nuclei to other nuclei greater than 0.9, said fibers occupying in the range of 1 to 80% of the free volume of said reaction zone, exposing said reaction zone to irradiation by fast neutrons having an average energy above 100 e.v., the average fast neutron flux in said reaction zone being in the range of $10^9$ to $10^{16}$ neutrons per centimeter$^2$ per second, passing said vaporous organic material through said reaction zone so irradiated at a pressure and a temperature sufficient to assure substantial maintenance of vapor phase conditions and the density of said organic material during conversion of less than 0.5 gram per centimeter$^3$, removing irradiated vapors from said reaction zone and recovering product therefrom.

7. A nuclear reactor adapted for the vapor phase conversion of organic reactants consisting essentially of an organic conversion zone in which is spaced fuel elements adapted to be penetrated by fast neutrons; said fuel elements containing fissile material arranged to support a sustained nuclear reaction, wherein fast neutrons are released producing an average fast neutron flux in the conversion zone of about $10^9$ to $10^{16}$ neutrons per centimeter$^2$ per second; said fissile material being spaced within the conversion zone which zone contains solid moderating material through which organic reactants in the vapor phase are passed; said moderating material consisting of finely divided, solid hydrogen bearing material, occupying in the range of 1 to 80% of the free volume of said organic conversion zone, said solid material having at least one dimension in the range of 0.5 to 20 microns, a true density in the range of 0.5 to 2 grams/cm$^3$, and a ratio of hydrogen nuclei to other nuclei greater than 0.9; cooling means adapted to extract heat from said fuel elements and said fissile material; said cooling means providing for the flow of coolant through said fuel elements; and inlet means for admitting an organic vapor phase reactant material to, and an outlet means for removing vapor phase product from said organic conversion zone.

8. The nuclear reactor of claim 7 wherein said organic reactants and said solid hydrogen bearing material within said organic conversion zone supply the principal moderation for said nuclear reaction.

References Cited in the file of this patent

UNITED STATES PATENTS

| | | |
|---|---|---|
| 2,743,223 | McClinton et al. | Apr. 24, 1956 |
| 2,845,388 | Black et al. | July 29, 1958 |
| 2,845,414 | Schutze | July 29, 1958 |
| 2,872,396 | Wilson et al. | Feb. 3, 1959 |
| 2,894,891 | Grebe | July 14, 1959 |
| 2,905,606 | Long et al. | Sept. 22, 1959 |
| 2,905,610 | Wigner | Sept. 22, 1959 |
| 2,954,334 | Stoops et al. | Sept. 27, 1960 |
| 2,958,637 | Voorhees | Nov. 1, 1960 |

FOREIGN PATENTS

| | | |
|---|---|---|
| 708,901 | Great Britain | May 12, 1954 |